US012732952B2

(12) United States Patent
Bhatnagar et al.

(10) Patent No.: US 12,732,952 B2
(45) Date of Patent: Sep. 8, 2026

(54) FUNCTION NODE AND METHOD IN A COMMUNICATIONS NETWORK

(71) Applicant: Telefonaktiebolaget LM Ericsson (publ), Stockholm (SE)

(72) Inventors: Gaurav Bhatnagar, Delhi (IN); Saurabh Gupta, Etawah (IN); Shishir Kumar Gupta, Uttar Pradesh (IN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 351 days.

(21) Appl. No.: 18/268,636

(22) PCT Filed: Dec. 24, 2020

(86) PCT No.: PCT/IN2020/051052
§ 371 (c)(1),
(2) Date: Jun. 21, 2023

(87) PCT Pub. No.: WO2022/137246
PCT Pub. Date: Jun. 30, 2022

(65) Prior Publication Data

US 2024/0049170 A1 Feb. 8, 2024

(51) Int. Cl.
*H04W 24/08* (2009.01)
*H04W 64/00* (2009.01)

(52) U.S. Cl.
CPC ......... *H04W 64/006* (2013.01); *H04W 24/08* (2013.01)

(58) Field of Classification Search
CPC ..... H04W 4/029; H04W 12/63; H04W 24/08; H04W 64/006
See application file for complete search history.

(56) References Cited

U.S. PATENT DOCUMENTS

| | | | |
|---|---|---|---|
| 9,241,059 | B2 | 1/2016 | Scott et al. |
| 2011/0151842 | A1 | 6/2011 | Oliney et al. |
| 2016/0080561 | A1 | 3/2016 | Wei |

FOREIGN PATENT DOCUMENTS

| | | | |
|---|---|---|---|
| CN | 108235257 | A | 6/2018 |
| WO | 2019231631 | A1 | 12/2019 |

OTHER PUBLICATIONS

Rosenberg, et al., "SIP: Session Initiation Protocol," Network Working Group, Request for Comments 3261, Jun. 2002, The Internet Society, 270 pages.

(Continued)

*Primary Examiner* — Sam Bhattacharya
(74) *Attorney, Agent, or Firm* — Withrow & Terranova, PLLC

(57) ABSTRACT

A method performed by a function node for handling a voice call from a first User Equipment (UE) to be received by a second UE in a communications network. The function node is associated with the second UE. The function node receives an invite message that relates to an initiation of the voice call from the first UE to the second UE and comprises one or more parameters associated with the second UE and a time stamp of the initiating of the voice call. The function node retrieves location data from a home server associated with the second UE, based on the one or more parameters and the time stamp, which location data indicates a geographical location of the second UE. The function node predicts a reason why the second UE cannot receive the voice call, based on the location data.

13 Claims, 12 Drawing Sheets

(56) References Cited

OTHER PUBLICATIONS

Extended European Search Report for European Patent Application No. 20966770.8, mailed Jun. 3, 2024, 10 pages.
Author Unknown, "IMS Profile for Voice and SMS," Version 11.0, Jun. 15, 2017, GSM Association, 57 pages.
Author Unknown, "Technical Specification Group Services and System Aspects; IP Multimedia Subsystem (IMS); Stage 2 (Release 16)," Technical Specification 23.228, Version 16.5.0, Sep. 2020, 3GPP Organizational Partners, 349 pages.
Author Unknown, "VoLTE Service Description and Implementation Guidelines," Version 1.1. Mar. 26, 2014, GSM Association, 121 pages.
International Search Report and Written Opinion for International Patent Application No. PCT/IN2020/051052, mailed Mar. 9, 2021, 8 pages.
Examination Report for European Patent Application No. 20966770.8, mailed Aug. 12, 2025, 10 pages.

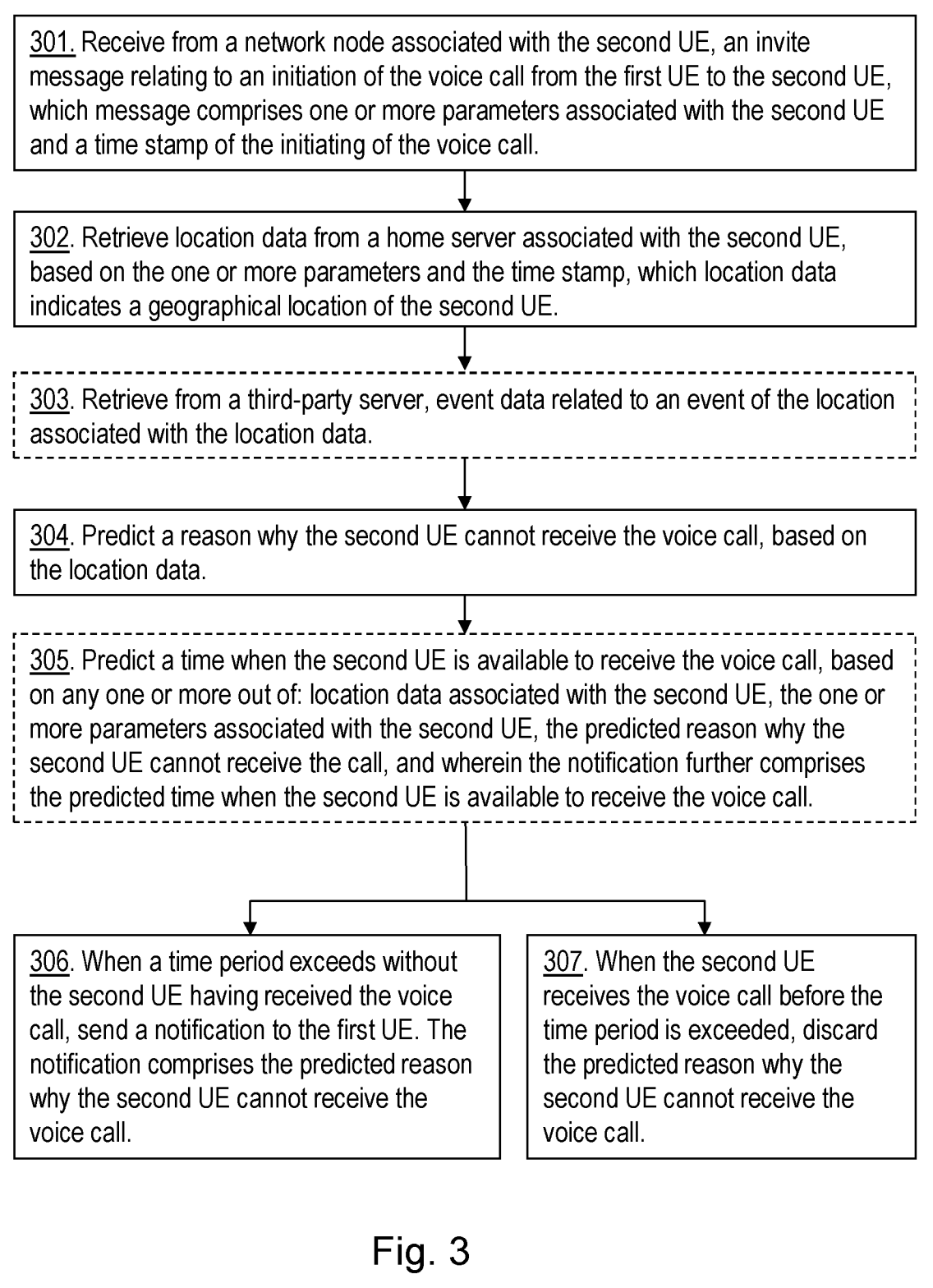

301. Receive from a network node associated with the second UE, an invite message relating to an initiation of the voice call from the first UE to the second UE, which message comprises one or more parameters associated with the second UE and a time stamp of the initiating of the voice call.

302. Retrieve location data from a home server associated with the second UE, based on the one or more parameters and the time stamp, which location data indicates a geographical location of the second UE.

303. Retrieve from a third-party server, event data related to an event of the location associated with the location data.

304. Predict a reason why the second UE cannot receive the voice call, based on the location data.

305. Predict a time when the second UE is available to receive the voice call, based on any one or more out of: location data associated with the second UE, the one or more parameters associated with the second UE, the predicted reason why the second UE cannot receive the call, and wherein the notification further comprises the predicted time when the second UE is available to receive the voice call.

306. When a time period exceeds without the second UE having received the voice call, send a notification to the first UE. The notification comprises the predicted reason why the second UE cannot receive the voice call.

307. When the second UE receives the voice call before the time period is exceeded, discard the predicted reason why the second UE cannot receive the voice call.

Fig. 3

FUNCTION NODE AND METHOD IN A COMMUNICATIONS NETWORK

This application is a 35 U.S.C. § 371 national phase filing of International Application No. PCT/IN2020/051052, filed Dec. 24, 2020, the disclosure of which is incorporated herein by reference in its entirety.

TECHNICAL FIELD

Embodiments herein relate to a function node and a method therein. In some aspects, they relate to handling a voice call from a first User Equipment (UE) to be received by a second UE in a communications network.

BACKGROUND

In a typical wireless communication network, wireless devices, also known as wireless communication devices, mobile stations, stations (STA) and/or UE, communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially “flat” architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel Such systems and/or related techniques are commonly referred to as MIMO.

Voice Over 5G 5G provides a new set of voice services such as e.g. Voice Over 5G (Vo5G) comprising substantially enhanced voice capabilities and supports ultra High Definition (HD) voice communications. 3GPP specifies in TS 23.228 that a 5G network must provide voice and video call services using Internet Protocol Multimedia Network Subsystem (IMS). An example scenario in an IMS telecommunications network 12 is illustrated in FIG. 1 where a first UE 10 is calling a second UE 11 using IMS in the telecommunications network 12.

Operators may integrate their existing IMS network to new 5G systems to provide Voice service using a 5G Access Network (AN) and 5G CN. When using 5G NR as the Radio Access Technology (RAT), in 5G, Vo5G call services using 5G RAN and 5G Core is then referred to as Voice Over New Radio (VoNR). In contrast, when LTE is used as the RAT, Vo5G may be referred to as VoLTE.

Error Handling in Voice Calls

Though many great strides have been made in the field of voice communication, error handling of calls remains a neglected field where error handling of why a call is missed often is handled by intuition.

SUMMARY

As a part of developing embodiments herein a problem was identified by the inventors and will first be discussed.

Regarding the above mentioned error handling of calls, as an example, in an IMS network during setup of a voice call, e.g. Vo5G, a calling party calls a called party without any answer. Though there are many reasons why the called party did not answer the call, the reason or reasons are left unknown to the calling party. A standard no response message sent by a Communication Service Providers (CSP) may therefore default to merely notifying that there is no response by the called party. A problem arises in not knowing why a called party was not able to receive a voice call as CSPs do not have a mechanism for providing details of why a call was not received. Furthermore, as no reason for why the call was not received, it is also not possible to know when the called party may be available to receive the call.

In an example scenario, a calling party may call a called party. However, the called party may not be able to answer the incoming voice call due to e.g. any of:

- A catastrophic event in the location, such as an earthquake, or a chemical explosion which has led to a disruption of the communications network service the phone of the called party,
- it may be night-time or non-business hours at the location of the called party and thus it may be inconvenient for the called party to answer the incoming call, and
- the called party may be at an inconvenient location for answering the incoming voice call such as e.g. a shopping mall, library, or other public location.

The reasons for the called party not answering the incoming voice call can thus be many. The calling party is thus left uncertain of why the called party is not answering the call. Furthermore, the calling party is uncertain of when is a suitable time to voice call the called party.

An object of embodiments herein is thus to provide an improved method for handling a voice call in a communications network.

According to an aspect of embodiments herein, the object is achieved by a method performed by a function node for handling a voice call from a first UE to be received by a second UE in a communications network. The function node is associated with the second UE. The function node receives an invite message from a second network node associated with the second UE. The invite message relates to an initiation of the voice call from the first UE to the second UE. The invite message comprises one or more parameters associated with the second UE and a time stamp of the initiating of the voice call. The function node retrieves location data from a home server associated with the second UE, based on the one or more parameters and the time stamp. The location data indicates a geographical location of the second UE. The function node predicts a reason why the second UE cannot receive the voice call, based on the location data.

When a time period exceeds without the second UE having received the voice call, the function node sends a notification to the first UE. The notification comprises the predicted reason why the second UE cannot receive the voice call.

When the second UE receives the voice call before the time period is exceeded, the function node discards the predicted reason why the second UE cannot receive the voice call.

According to another aspect of embodiments herein, the object is achieved by a function node configured to handle a voice call from a first UE, to be received by a second UE in a communications network. The function node is arranged to be associated with the second UE. The function node is further is configured to:

Receive from a second network node associated with the second UE, an invite message relating to an initiation of the voice call from the first UE to the second UE, which invite message is adapted to comprise one or more parameters associated with the second UE and a time stamp of the initiating of the voice call, retrieve location data from a home server associated with the second UE, based on the one or more parameters and the time stamp, which location data is adapted to indicate a geographical location of the second UE, predict a reason why the second UE cannot receive the voice call, based on the location data, and when a time period exceeds without the second UE having received the voice call, send a notification to the first UE, which notification is adapted to comprise the predicted reason why the second UE cannot receive the voice call, when the second UE receives the voice call before the time period is exceeded, discard the predicted reason why the second UE cannot receive the voice call.

Since the function node retrieves the location data and time stamp associated with the second UE, the function node is able to predict a reason for why the second UE may not receive the call, based on the current location of the second UE,

BRIEF DESCRIPTION OF THE DRAWINGS

Examples of embodiments herein are described in more detail with reference to attached drawings in which:

FIG. 3 is a flowchart depicting an embodiment of a method in a function node.

DETAILED DESCRIPTION

Some embodiments herein provide methods for predicting a reason why a voice call is not received by a called party. Some embodiments herein further provide methods for predicting when a called party may be available to receive a voice call.

Figure 1:
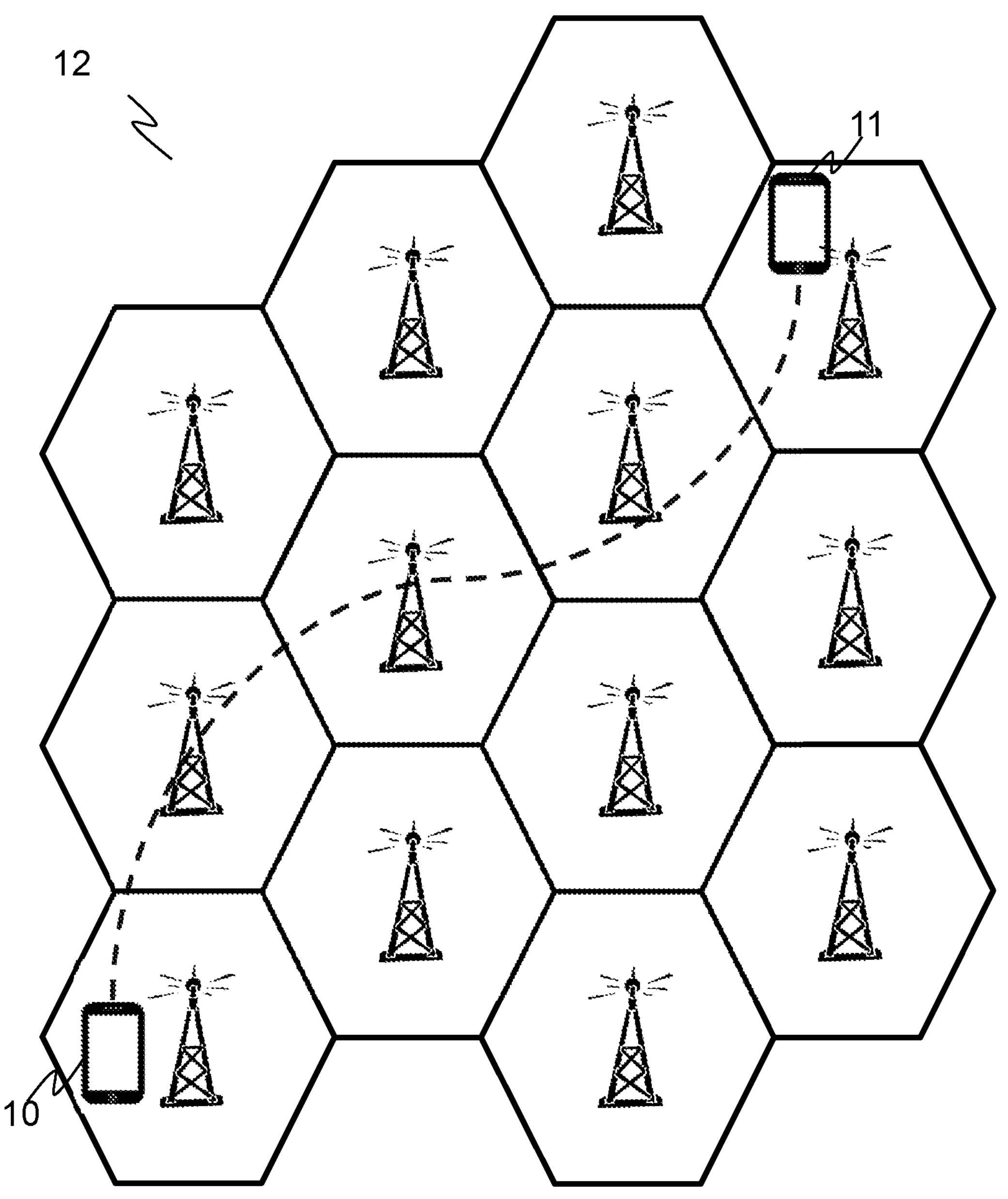
FIG. 1 is a schematic block diagram illustrating prior art.
Figure 2:
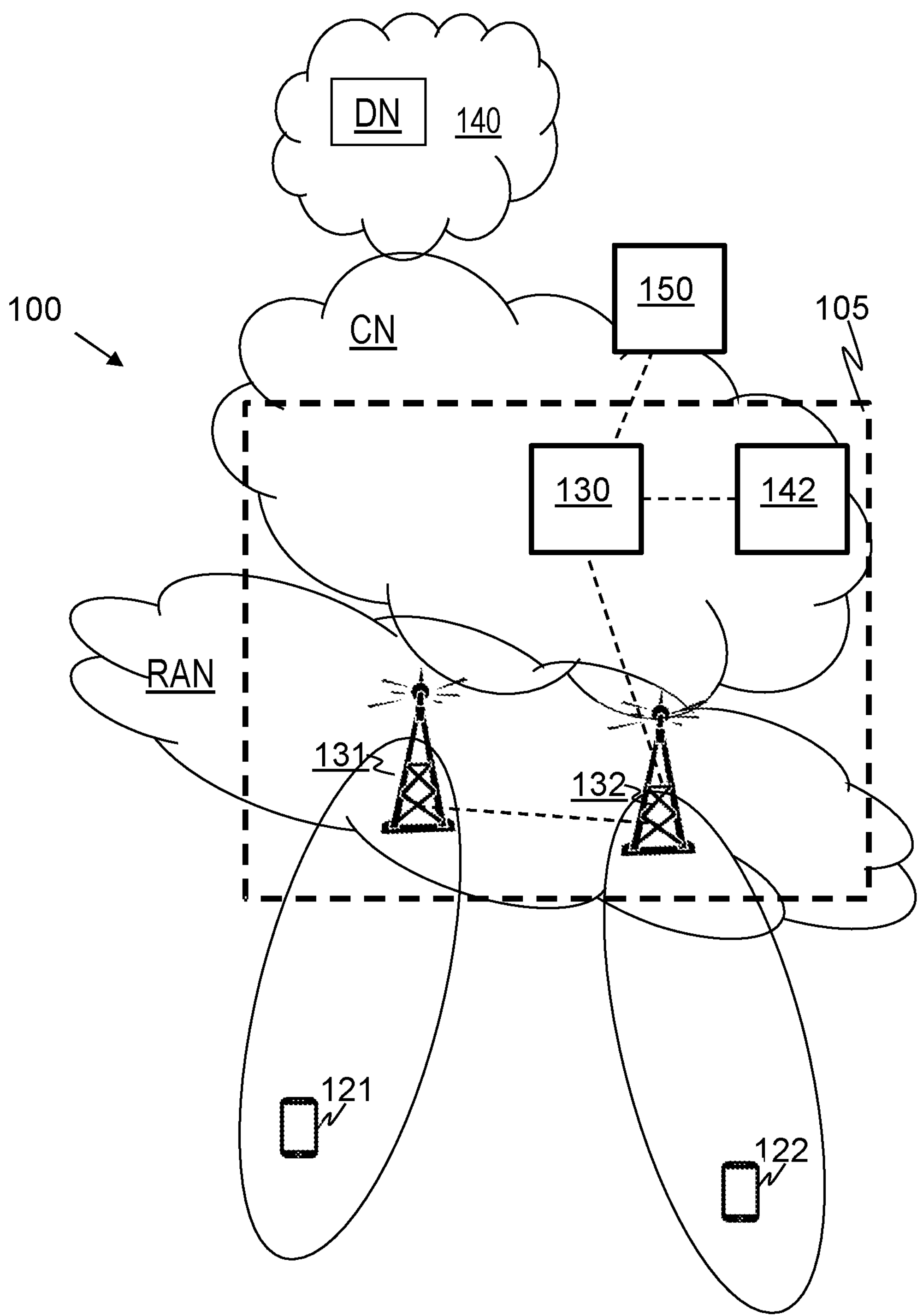
FIG. 2 is a schematic block diagram illustrating embodiments of a communications network.

Embodiments herein relate to wireless communication networks in general. FIG. 2 is a schematic overview depicting a communications network 100 wherein embodiments herein may be implemented. The communications network 100 comprises one or more RANs and one or more CNs. The communications network 100 may use a number of different technologies, such as Wi-Fi, Long Term Evolution (LTE), LTE-Advanced, 5G, NR, Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UMB), just to mention a few possible implementations. Embodiments herein relate to recent technology trends that are of particular interest in a 5G context, however, embodiments are also applicable in further development of the existing communication systems such as e.g. WCDMA and LTE.

The communications network 100 may further comprise an IMS network 105 providing voice and video call services to end users such as UEs, e.g. UEs 121, 122.

A number of network nodes such as e.g. a first network node 131 and a second network node 132, operate in the communications network 100, e.g. as part of, or being accessible to an the IMS network 105. The network nodes 131, 132 may each be any of: An IMS node e.g. comprising, e.g. being accessible to a Proxy Call Session Control Function (P-CSCF), a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNodeB), a gNB, a base transceiver station, a radio remote unit, an Access Point Base Station, a base station router, a transmission arrangement of a radio base station, a stand-alone access point, or any other network unit capable of communicating with a wireless device within the service area served by each of the network nodes 131, 132. The first network node 131 is associated with a first UE 121 and may communicate with the first UE 121 with Downlink (DL) transmissions to the first UE 121 and Uplink (UL) transmissions from the first UE 121. The second network node 132 is associated with a second UE 122 and may communicate with the second UE 122 with DL transmissions to the second UE 122 and UL transmissions from the second UE 122. To be associated with the first and/or second UE 121, 122 e.g. means that they provide services to the respective first and/or second UE 121, 122, e.g. providing voice and video call services.

In the communication network 100, one or more UEs operate, such as e.g. the first UE 121 and the second UE 122.

The first UE 121 and the second UE 122 may also be respectively referred to as a device, an IoT device, a mobile station, a non-access point (non-AP) STA, a STA, a user equipment and/or a wireless terminal, communicate via one or more AN, e.g. RAN, to one or more core networks (CN). It should be understood by the skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a small base station communicating within a cell. The first UE 121 may communicate with the second UE 122 using embodiments herein, e.g. using Vo5G, VoLTE, or VoNR.

According to an example scenario herein the first UE 121 is a calling party, calling the second UE 122 for a voice call, which second UE 122 is a called party.

The function node 130 operates in the communications network 100. The function node 130, may be configured to handle a voice call from calling parties such as the first the UE 121 to be received by called parties such as the second UE 122. The function node 130 may be associated with the second UE 122 by e.g. being arranged with the second network node 132. To be associated with the second UE 122 means that the function node 130 is configured to handle voice calls related to the second UE 122. E.g. the function node 130 may be co-located with the second network node 132 and/or the home server 142, or may operate as a separate node or unit. The function node 130 may e.g. comprise a Network Function (NF) which e.g. may be referred to as a Call No Response Enrichment Function (CNREF).

The home server 142 operates in the communications network 100. The function node 130. The home server 142 may be a server or database, and is associated with the second UE 122. To be associated with the second UE 122 means that the home server 142 is configured to be able to locate the second UE 122 and is able to respond to queries relating to the location of the second UE 122. The home server 142 may be configured to provide information, e.g. location data, about the location of the second UE 122. The second UE 122 may have subscribed to services of the home server 142 and may also be known as a subscriber to the home server 142. The home server 142 may e.g. be a Unified Data Management (UDM), or a Home Server Subscriber (HSS) and may keep track of the location of the second UE 122 e.g. by storing customer profile data and authentication information along with encryption keys. The home server 142 may further be configured to receive updates of the current location of the second UE 122 by the network node 132, e.g. when there is a location update. The home server 142 may be able to communicate the location data associated with the UE 122 to the function node 130. The home server 142 may e.g. be co-located with the network node 132 and/or the function node 130, or may operate as a separate node or unit The third-party server 150 may be any type of server in communication with the function node 130. The third-party server 150 when used herein e.g. means a server such as e.g. a news agency server, a weather department server, or a current affairs media server holding latest news of various locations of the world. The third-party server 150 may be located in another remote network, different from the function node 130. The third-party server 150 may e.g. provide a service or database to the function node 130 such as reporting event data relating to specific locations.

The first UE 121 and second UE 122 may communicate over voice call by means of connecting the first UE 121 and the second UE 122, via the first network node 131 and the second network node 132. The connection between the first network node and the second node 132 may be initiated and/or maintained by signalling, e.g. IMS signalling.

Methods herein may be performed by the function node 130. As an alternative, a Distributed Node (DN) and functionality, e.g. comprised in a cloud 140 as shown in FIG. 2, may be used for performing or partly performing the methods herein.

A number of embodiments will now be described, some of which may be seen as alternatives, while some may be used in combination.

Some examples of the embodiments herein relate to handling voice calls, such as any of Vo5G, VoLTE, and VoNR. The function node 130 may in embodiments herein, be able to identify a reason to why the called second UE 122 is not receiving the voice call from the calling first UE 121. The function node 130 may request and receive, also referred to as fetch, the current location data of the called second UE 122 from the home server 142. The location data may then be used to contact the third-party server 150 such as e.g. a news agency server and/or a weather department server, to find out any current events relating to the location, e.g. catastrophes, daily routines or public holidays, which may be the reason why the call was not answered. The function node 130 may also, based on the location data, determine or obtain the local time and/or time zone of the location of the called second UE 122. When a call is not received by a called second UE 122, the function node 130 may then predict a reason why that the call was not answered, e.g. due to a local time of the location being outside of business hours or nighttime at the location of the called second UE 122. The function node 130 may also predict, e.g. that the reason the called second UE is not receiving the call may be due to travelling, being at a shopping mall, or that there is a catastrophe, e.g. an earthquake at the location of the called second UE 122. When the function node 130 has predicted the reason why the call is not answered by the called second UE 122, the function node 130 may provide the reason why the call is not received, to the calling first UE 121. The provided reason why the call is not received may be visible to a user of the calling first UE 121, e.g. as a message on the screen of the calling first UE 121 or as a voice using text to speech technology. The function node 130 may also in some embodiments herein, further predict when the called second UE 122 may be able to receive the call, and further may provide this information to the calling first UE 121.

Some advantages of embodiments herein lie in an increased understanding of reasons why a call was not received by the called second UE 122, e.g. why is a called party or a user of the second UE 122 not answering the incoming voice call. Increasing the understand of why a call is not received may save time and communication resources. This is since in embodiments herein, instead of iteratively and/or randomly calling until a call is received, it may be possible to use the obtained information of why a call is not received to more efficiently schedule, manually or automatically, e.g. by the calling first UE 121, or the function node 130, function node 130 can store the notification information for some time, when to call again or when a call may be received by the second UE 122, e.g. based on a predicted reason why a call was not received or based on a predicted time a call can be received.

FIG. 3 shows example embodiments of a method performed by the function node 130 for handling a voice call from the first UE 121 to be received by the second UE 122 in the communications network 100. The function node 130 is associated with the second UE 122.

The method comprises the following actions, which actions may be taken in any suitable order. Optional actions are referred to as dashed boxes in FIG. 3.

Action 301

In an example scenario herein, the first UE 121 initiates a voice call to the second UE 122, e.g. by sending an invite message relating to an initiation of the voice call from the first UE 121 to the second UE 122. The invite message may be a SIP invite and the invite message may be sent to the second UE 122 via the first network node 131. The first network node 131 may then send the invite to the second UE 122 via the second network node 132. The second network node 132 may then send the invite message to the second UE 132. The second network node 132 may also send the invite message to the function node 132 for handling the voice call from the first UE 121 to be received by the second UE 122. In this way, the invite message relating to the initiation of the voice call request may e.g. be sent in parallel to sending the invite message to the function node 130.

The function node 130 receives an invite message from the second network node 132 associated with the second UE 122. The invite message relates to an initiation of the voice call from the first UE 121 to the second UE 122. By receiving the invite message, the function node 130 knows that the of the voice call has been initiated and this may trigger the function node 130 start to handle the voice call from the first UE 121 to the second UE 122 according to embodiments herein. The message comprises one or more parameters associated with the second UE 122 and a time stamp of the initiating of the voice call. The one or more parameters may enable the function node 130 to identify the voice call to the second UE 122, and when the voice call to the second UE 122 is initiated.

In some embodiments, the one or more parameters associated with the second UE 122 comprises any one or more out of:

- a call history of the second UE 122,
- movement data associated with the second UE 122,
- a set of one or more trusted callers, and
- whether or not the second UE 122 is roaming,
- a privacy indication indicating which information is authorized or unauthorized to send to the first UE 121.

Action 302

The functional node 130 retrieves location data from the home server 142 associated with the second UE 122. The location data is based on the one or more parameters and the time stamp. The location data indicates a geographical location of the second UE 122. The retrieved location data may be used by the functional node 130 to attain more detailed data relating to the second UE 122 to be used for the predicting a reason why the second UE 122 cannot receive the voice call, if it cannot receive the voice call. This action may be performed after or before it is known whether or not the second UE 122 receives the voice call.

It may in this way be possible to identify the location of the second UE 122 during the voice call, or initiation of the voice call, from the first UE 121 to the second UE 122.

Action 303

In some embodiments, the function node 130 retrieves event data from a third-party server 150. The event data is related to an event of the location associated with the location data. In other words, the function node 130 may retrieve data relating to events taking place at the location of the second UE 122. This may be to enable a more precise way to predict a reason why the voice call may not be received by the second UE 122. The third-party server 150 may e.g. be a news server, weather server, or any server with information of events at the location of the second UE 122.

In some embodiments, the event data comprises any one or more out of:

- an alternative location identifier of the second UE 122,
- weather conditions associated with the location data,
- emergency conditions associated with the location data,
- national holidays associated with the location data,
- public, cultural, or religious events associated with the location data, and
- time of day or time zone associated with the location data.

Action 304

The function node 130 predicts a reason why the second UE 122 cannot receive the voice call based on the location data. After retrieving the location data and in some embodiments also the event data, the function node 130 is then able to predict why the second UE 122 cannot receive the voice call, if that happens to be the case. This may e.g. be since a called party at the second UE 122 is at an inconvenient location for answering the voice call. This in turn may be since the second UE 122 is at a shopping mall, library, religious site, outside, or any other location not suitable for the incoming voice call which may be a confidential voice call or a business voice call which demands that the called party such as the second UE 122 answers at a proper location, e.g. in private. This may also e.g. be since the location data indicates that the second UE 122 is located at, or in proximity to, a place associated with travelling, such as an airport.

In some embodiments, the function node 130 predicts the reason why the second UE 122 cannot receive the voice call further based on the event data. By basing it on the event data, it may thus be possible to predict a reason for why the second UE 122 cannot receive the call due to events at the site of the second UE 122 such as e.g. that it may be nighttime at the location of the second UE 122, the second UE 122 may be travelling or roaming, or the weather conditions may not allow for the second UE 122 to receive the call. Using this information, it may thus be possible to e.g. schedule when the second UE 122 may be able to receive the call.

Action 305

In some embodiments, the function node 130 predicts a time when the second UE 122 is available to receive the voice call, based on any one or more out of:

- location data associated with the second UE 122,
- the one or more parameters associated with the second UE 122,
- the predicted reason why the second UE 122 cannot receive the call, and
- wherein the notification further comprises the predicted time when the second UE 122 is available to receive the voice call. In other words, the function node 130 may accurately predict when the second UE 122 may be able to receive the call, e.g. by using the information from any one or more of: the location data, the time stamp, the one or more parameters associated with the second UE 122, and the predicted reason why the second UE 122 cannot receive the call. The time when the second UE 122 is able to receive the call may be predicted by using any suitable method, e.g. by using statistical estimations of when the second UE 122 is often receiving previous calls during similar circumstances, e.g. such as any one or more out of a location, time, or caller as a parameter, or using a call history of the second UE 122 to predict usual times when the second UE 122 receives call. In this way, the function node 130 may e.g. be able to predict that it is nighttime in the location of the second UE 122, and that the second UE 122 may likely receive the call in 8 hours.

In some embodiments, the function node 130 predicts the time when the second UE 122 is available to receive the voice call further based on the event data. In this way, it may be possible to yet more accurately predict when a second UE 122 may be able to receive the call. This may be since it is a national holiday in the location of the second UE 122, and the function node 130 may thus predict that the second UE 122 may be able to receive the voice call the next day e.g. at the time of official office hours in the country or region where the second UE 122 may be located.

Action 306

When a time period exceeds without the second UE 122 having received the voice call, the function node 130 sends a notification to the first UE 121. This may e.g. be since the UE 122 is not answering the call, e.g. by actively dismissing the voice call or by passively not answering the call. The notification comprises the predicted reason why the second UE 122 cannot receive the voice call. The first UE 121 may then receive the notification comprising the predicted reason by receiving a short message service (SMS) message, receiving an Unstructured Supplementary Service Data (USSD) notification or by receiving a voice message using text to speech technology or similar. The first UE 121 is thus informed of why the second UE 122 cannot receive the call. In this way, a user of the first UE 121 may then be informed of the reason why the second UE 122 is not receiving the call by e.g. reading the notification displayed in a display of the second UE 122. The user of the first UE 121 and/or the calling party may then accurately schedule when to call the second UE 122.

Action 307

When a second UE 122 does receive the voice call, the predicted reason is false and will not be used. Thus, when the second UE 122 receives the voice call before the time period is exceeded, the function node 130 discards the predicted reason why the second UE 122 cannot receive the voice call.

In some embodiments, the function node 130 may store an indication of the received voice call in the call history of the second UE 122. In this way, it is possible when a future call to the second UE 122 is not received, to use the stored call history to more accurately predict when the second UE 122 may be able to receive the future call.

In some embodiments, the function node 130 is comprised in the IMS network 105. E.g. the function node 130 may be a CNREF function node, and the second network node 132 may be a P-CSCF node. The invite message may be a SIP message relating to the initiation of the voice call using any of: VoLTE, and VoNR. The SIP message may be sent by the second network node 132 and may further e.g. be a replicated or duplicated SIP Invite. The second network node 132 may further send the SIP message to the function node 130 in parallel to sending a corresponding SIP message to the second UE 122.

Figure 4:
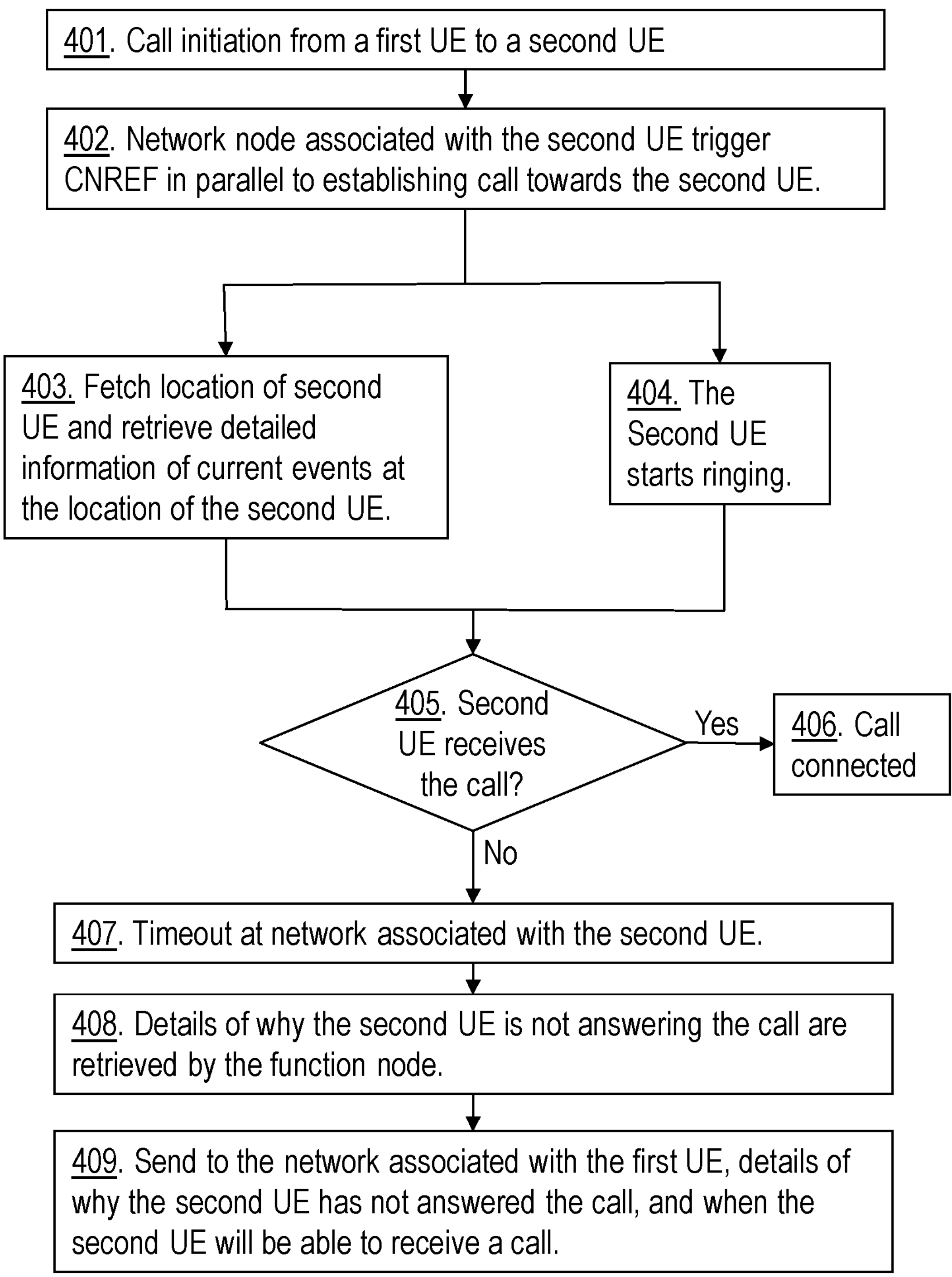
FIG. 4 is a flowchart depicting an embodiment of a method.

An example method of embodiments herein is illustrated in FIG. 4, where a first user is associated with the first UE 121, where the first UE 121 is also known as the calling party. This means that the first user is able to e.g. initiate calls with the first UE 121 and able to receive notifications of why a call to the second UE 122 is not received. A second user is associated with the second UE 122 where the second UE 122 is also known as the called party. This means that the second user may have the option of answering incoming calls to the second UE 122. The first UE 121 and the second UE 122 may in this scenario be connected in the communications network 100.

The scenario may start with initiating 401 a call from the first UE 121 to the second UE 122, e.g. using VoNR, or VoLTE. In other words, the first user calls the second user's second UE 122 using the first UE 121. This may e.g. relate to sending the invite message in action 301 above.

The second network node 132 associated with the second UE 122 may, in parallel to establishing a voice call to the second UE 122, trigger 402 a CNREF NF, e.g. relating to the function node 130 to executing action 301 above. In other words, the function node 130 may be triggered to start predicting a reason why the second UE 122 may not receive the call.

The called party may be travelling at a remote location which is geographically different from the location of the calling party. The function node 130 may then fetch 403 a location of the second UE 122 and retrieve detailed information of current events at the location of the second UE 122. The location data may be retrieved from a UDM or an HSS, e.g. in the home server 142. This may relate to retrieving location data, and/or event data e.g. as in actions 302 and 303 above.

The second UE 122 may start ringing 404, also referred to as calling, indicating an incoming call, e.g. to the called party.

When the second UE 122 is ringing, the second UE 122 may receive 405 the call or not receive the call. In other words, the second user of the second UE 122 may e.g. have the option to answer the incoming voice call or not, or may decide to not answer the incoming call. The second user may also not notice the incoming call, e.g. due to it being night-time and the second user is sleeping.

If the called party, e.g. the second user, answers the incoming call, also referred to as receiving 406 the incoming call, the call may be connected between the calling party and the called party, and the first user and the second user may then communicate using the connected voice call. The function node 130 may further record a voice call receive pattern of the called party e.g. using information of the received call. The function node 130 may then for future voice calls, use the voice call receive pattern to predict when the called party, e.g. is most likely, to be able to receive a call. This may relate to action 307 above. The predicted reason may now be discarded.

However, the called party may not be able to receive the incoming voice call due to e.g. any of:

- A catastrophic event in the location, such as an earthquake, or a chemical explosion leading to disruption of the communications network,
- it may be night-time or non-business hours at the location of the second UE 122 and thus it may be inconvenient for the called party to receive the incoming call, and
- the called party may be at an inconvenient location for receive the voice call such as e.g. a shopping mall, library, or other public location.

The reasons for the called party is not receiving the incoming voice call may thus be many, and may in this way be predicted by the function node 130 based on the location data. The prediction may further also be based on event data collected from the third-party server 150, e.g. by identifying certain events at the location associated with the location data. The function node 130 may then, based on the location data, determine that it is nighttime at the location of the second UE 122, and thus, the function node 130 may predict that the second UE 122 may not receive the call as the second user is sleeping. This may relate to action 303 above.

The function node 130 may further also use the location data, event data, or any other collected parameter to further also predict a time when it may be suitable to call the called party. E.g. if the predicted reason for why the second UE 122 is not receiving the call is due to the second user is sleeping, the function node 130 may be able to predict that, the second UE 122 may be able receive the call during office hours the next day. This may relate to action 304 above.

A timeout may then be experienced 407 at the network, e.g. by the second network node 132 due to the second UE 122 is not receiving the call, e.g. the second user is not answering the incoming voice call. Details of why the second UE 122 is not receiving the call may be retrieved 408 by the second network node 132 from the function node 130. The network node 132 then may further send 409 to the network associated with the first UE 121, e.g. the first network node 131, details of why the second UE 122 has not received the voice call, and when the second UE 122 may be able to receive a call. This may e.g. relate to action 306 above.

Hence as exemplified above, in embodiments herein, the function node 130 may enable CSPs to add meaningful and context information in scenarios of calls not received by the second UE 122. The CSP may thus be able to, by use of the function node 130, notify the first UE 121, with any of the following kind of detailed information in various cases of when the second UE 122 may not receive the voice call from the first UE 121:

- The second UE 122 is in roaming and it is night-time at the location of the second UE 122, try calling in 6 hours,
- the called party may be driving or travelling, try calling in 2 hours.
- there is a heavy snowfall in the location of the second UE 122, try calling in 1 hour,
- the second UE 122 is in roaming and the called party is currently travelling, try calling in 1 day, and
- the called party is out shopping in the XYZ shopping, try calling in 1 hour.

As shown in above examples, the CSP may, by using embodiments herein, enrich a standard call no response message to a more meaningful and detailed message of why the second UE 122 is not receiving the call from the first UE 121.

Figure 5A:
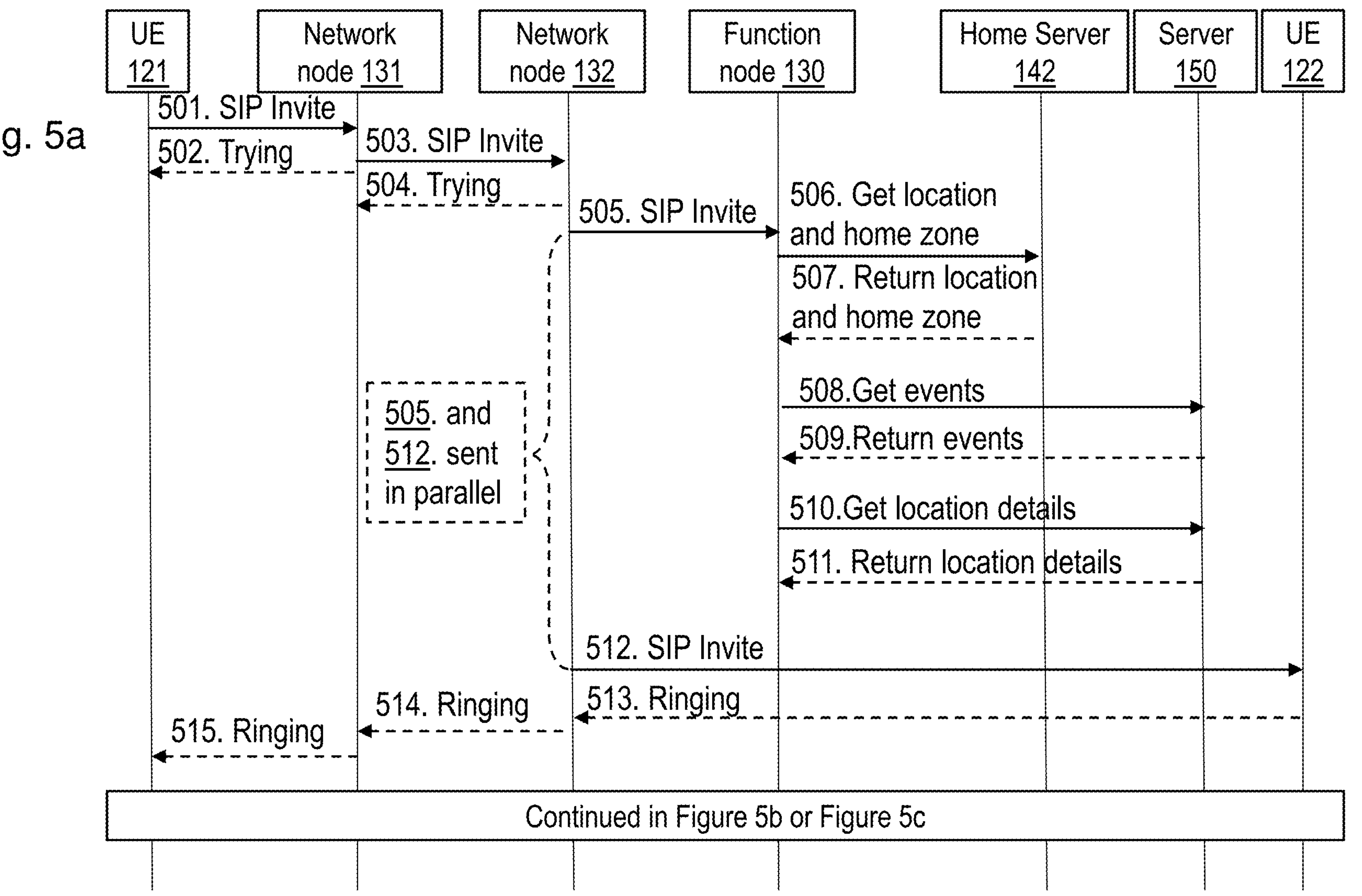
FIG. 5*a-c* are sequence diagrams depicting embodiments herein.
Figure 5B:
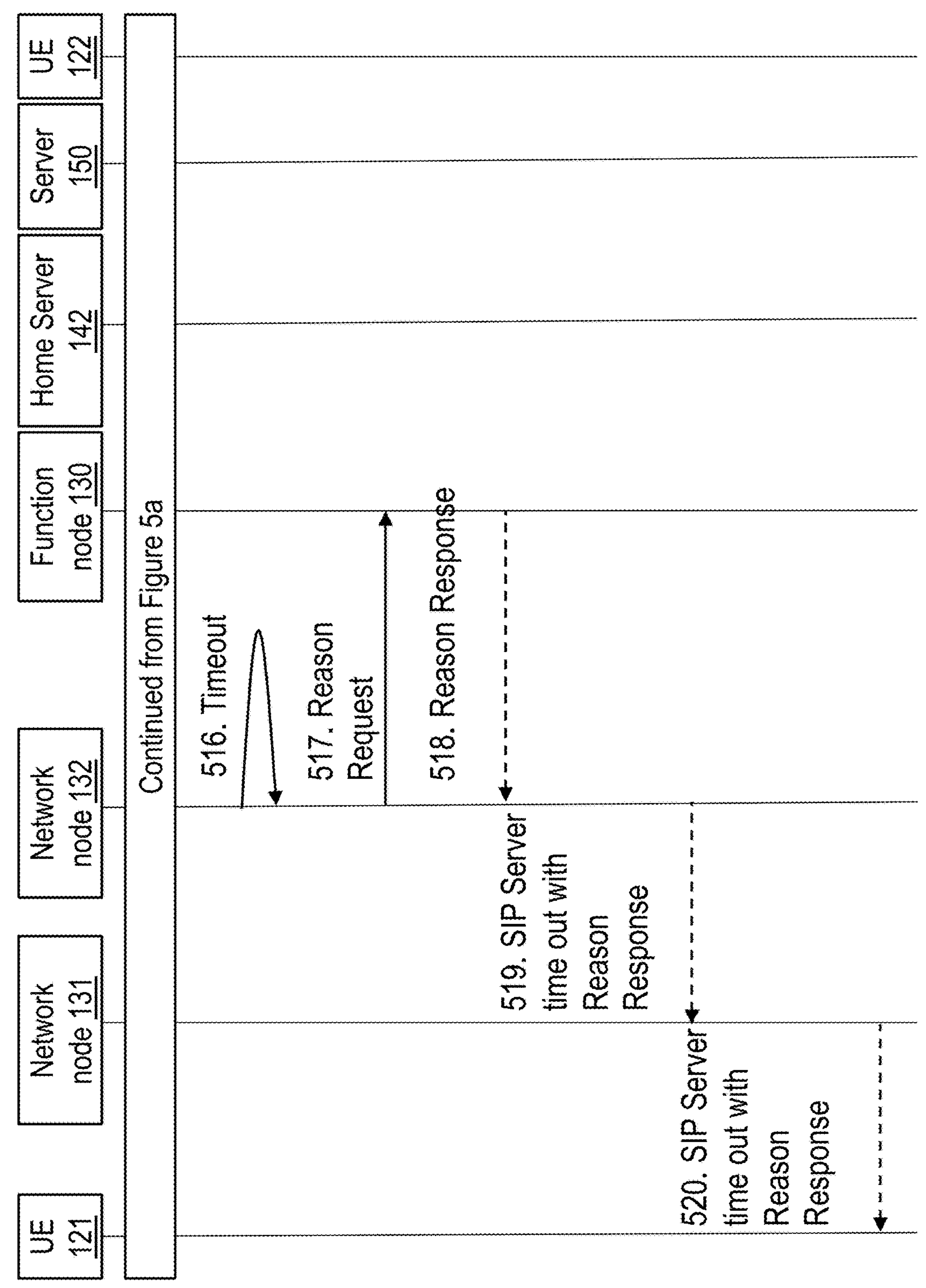
Figure 5C:
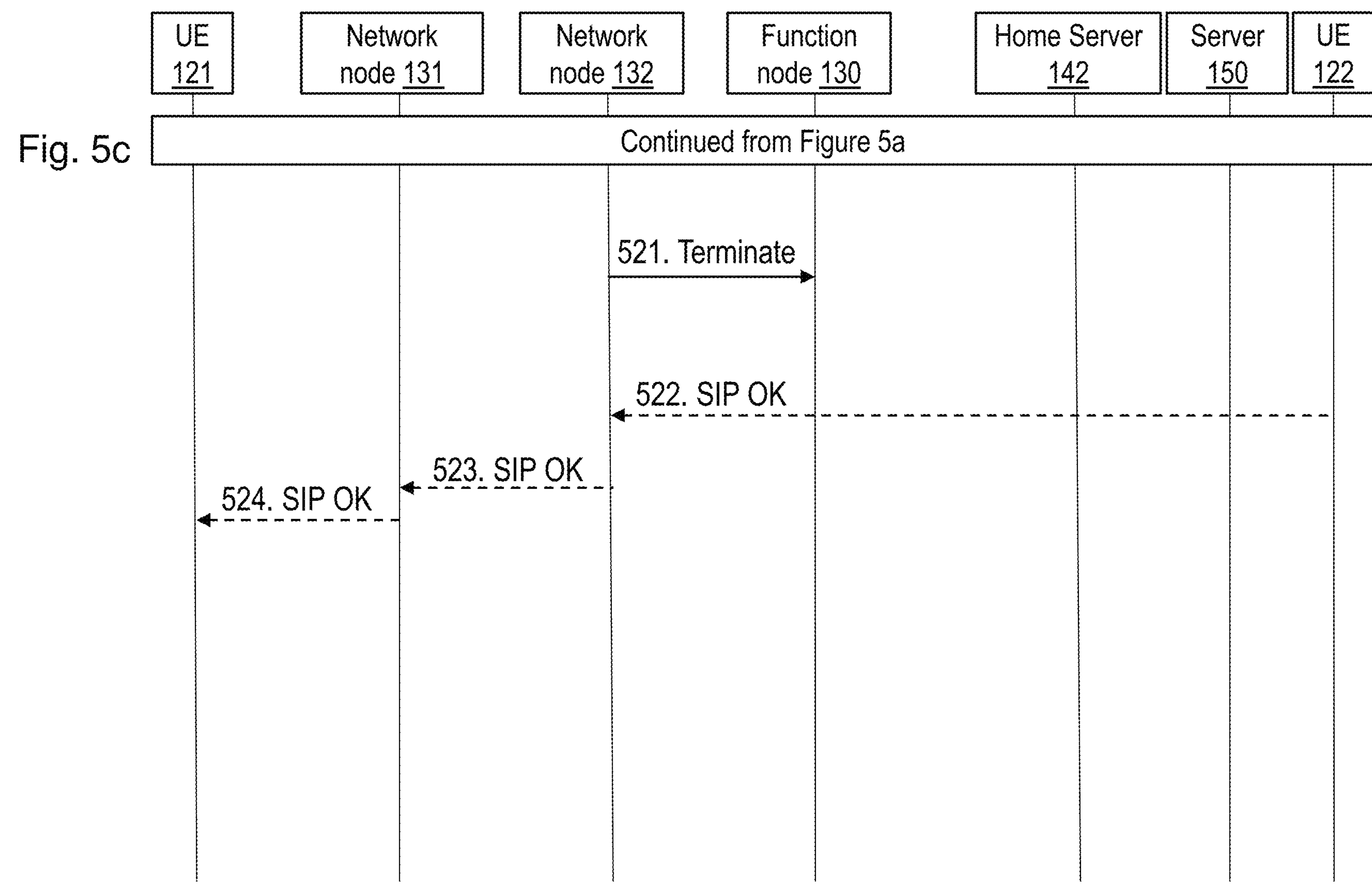

FIGS. 5*a*-*c* illustrates examples of embodiments herein in how the following network entities may interact and communicate. Initially in FIGS. 5*a*-*c*, an IMS signaling link is established using a default bearer involving 5G CN functions e.g. Access and Mobility Management Function (AMF), Session Management Function (SMF), User Plane Function (UPF) and IMS network functions P-CSCF, e.g. the first network node 131 and the second network node 132, and UDM and/or HSS connecting the first UE 121 with the second UE 122. The first UE 121 may communicate by IMS signalling via a default bearer to a UPF associated with the first UE 121. The default bearer and/or the IMS signalling to the UPF associated with the first UE 121 may also relate to an AMF associated with the first UE 121, and a SMF associated with the first UE 121. The UPF associated with the first UE 121 may have IMS signalling over Internet Protocol (IP) to an UPF associated with the second UE 122. The IMS signalling over IP may further be associated with a P-CSCF associated with the UE 121, e.g. the first network node 131, a P-CSCF associated with the second UE 122, e.g. the second network node 132, a CNREF node associated with the second UE 122, e.g. the function node 130, a UDM or HSS node associated with the second UE 122, e.g. the home server 142, an external application server to get environment events based on location, e.g. the third-party server 150. Furthermore, the second UE 122 may have IMS signalling via a default bearer to a UPF associated with the second UE 122. The default bearer and/or the IMS signalling to the UPF associated with the second UE 122 may also relate to an AMF associated with the second UE 122, and a SMF associated with the second UE 122. These embodiments may in other words relate to the above AMFs, SMFs, and UPFs providing connectivity between the first UE 121 and the second UE 122. In IMS terms, 5G or 4G may be acting as an Internet Protocol Connectivity Access Network (IP-CAN).

Call Initiation

In FIG. 5*a*, the first UE 121 may first send 501 a SIP Invite message to the first network node 131 which may reply 502 with a trying message to the first UE 121. The trying message may indicate to the first UE 121 that the network node 131 has received the SIP invite message and is forwarding the SIP invite message, e.g. to the second network node 132. The first network node 131, may be an IMS network node P-CSCF belonging to, also referred to as associated with, the first UE 121. The first network node 131 may further also use a 5G core network node as an IP-CAN.

The network node 131 may then forward 503 the SIP invite message to the second network node 132 associated with the second UE 122, to setup a voice call between the first UE 121 and the second UE 122. The second network node 132 may be a P-CSCF. The second network node 131 may reply 504 with a trying message to the first network node 131. The trying message may indicate to the first network node 131 that the second network node 132 has received the SIP invite message and is forwarding the SIP invite message to the function node 130 and the second UE 122. The second network node 132 send 505 the received SIP invite message to the function node 130 wherein the function node 130 may in this scenario be a CNREF function node executing a CNREF NF.

The function node 130 may receive the SIP Invite message and may extract a Mobile Station International Subscriber Directory Number (MSISDN) and a timestamp of the second UE 122 from e.g. the SIP Invite message. This may relate to action 301 described above.

The function node 130 may communicate with the home server 142, e.g. UDM or HSS, to get 506 location data such as location and home zone, e.g. using the MSISDN of the second UE 122. The home server 142 may then return 507 the location and home zone details, also referred to as location data, of the second UE 122 to the function node 130. This may relate to action 302 described above.

Using the location data, e.g. Global Positioning System (GPS) coordinates, received from the home server 142, the function node 130 may retrieve event data related to an event of the location associated with the location data by communicating with the third-party server 150, which e.g. may be a news server, to get 508 events associated with the location of the second UE 122. The third-party server 150 may then return 509 events associated with the location of the second UE 122 to the function node 130. This may relate to action 303 described above.

The events may e.g. relate to catastrophic or high impact events for the location of the second UE 122. The function node 130 may also communicate with the third-party server 150 to get 510 location details of the location of the second UE 122, e.g. a descriptive location name of the current location of the second UE 122. In some embodiments, the third-party server 150 may store descriptive location names for given GPS locations. The third-party server 150 may then the return 511 the location details to the function node 130.

Following the actions above, the function node 130 may now have any one or more of the following details of the second UE 122:

- Current location of the second UE 122, e.g. as GPS coordinates,
- knowledge of catastrophic or impact full event happening at the current location of the second UE 122, and
- a descriptive location name of the current location of the second UE 122, e.g. the descriptive location name may be a name of a shopping mall where the second UE 122 is located.

The function node 130 may then use the above one or more details to predict the reason why the second UE 122 may not be able to receive the voice call from the first UE 121. This may be performed using any of the methods presented in embodiments herein, e.g. by executing at least parts of the prediction algorithm presented in more detail below. This may relate to actions 304 and 305 described above.

Further, in order to protect the privacy of the second UE 122, it may be possible to check with whom sensitive information is allowed to be shared, e.g. the descriptive location name, may only be returned to, or used by the function node 130 when the first UE 121 is present in a Friends and Family (FnF) list associated with the second UE 122. The FnF list may be a list of identifiers of trusted UEs, trusted by the second UE 122. The list of identifiers may e.g. be at least one phone number of one or more trusted UEs belonging to a family member or a friend. The list of identifiers may also be a SIP address or any E.164 telephone number. The FnF list may be stored as part of a customer profile in a NF such as in a Charging Function (CHF), e.g. at the first network node 131 or the second network node 132. The FnF list may also be stored with, or as part of other NFs depending on CSP deployment. The FnF list may then enable that only the trusted UEs may be able to get a prediction of why the second UE 122 cannot receive the voice call based on sensitive information of the second UE 122.

When the second network node 132 sends the invite message such as the SIP invite message to the function node 130, the second network node may also send 512 to the second UE 122, the same SIP invite message, in parallel to the SIP invite message sent to the function node 130. Sending the SIP invite message to the second UE 122 may relate to communication using the UPF associated with the second UE 122, the SMF associated with the second UE 122, and the AMF associated with the second UE 122 as IP-CAN. The second UE 122 may respond 513 to the second network node 132 with a ringing signal, which indicates to the second network node 132 that the second UE 122 is ringing. The second network node 132 may then send 514 a ringing signal to the first network node 131 indicating to the first network node 131 that the second UE 122 is ringing. The first network node 131 may then send 515 a ringing signal to the first UE 121 indicating to the first UE 121 that the second UE 122 is ringing.

Call not Received

In some scenarios, the second UE 122 may not receive the call, e.g. the called party of the second UE 122 does not answer the incoming call and is illustrated in FIG. 5*b*. These scenarios may relate to action 306 described above.

The second network node 132 experiences 516 a timeout of the voice call from the first UE 121 to the second UE 122. E.g. the time of waiting for the UE 122 to receive the call may have exceeded a predetermined threshold.

In some embodiments, the second network node then requests 517 a reason for why the second UE 122 is not receiving the call from the function node 130. The function node 130 may then respond 518 with the predicted reason why the second UE 122 is not receiving the call.

The second network node 132 may then send 519, a SIP server timeout message to the first network node 131. The message may comprise the predicted reason why the second UE 122 is not receiving the call along with a timeout message from the second network node 132.

The first network node may further send 520 a SIP server timeout message to the first UE 121. The message may comprise the predicted reason why the second UE 122 is not receiving the call along with a timeout message from the second network node 132. In this way, the first network node 131 may notify the first UE 121 of the predicted reason why the second UE 122 is not receiving the voice call.

Call Received

In some scenarios, the second UE 122 may receive the call, e.g. the called party of the second UE 122 answers the incoming call, e.g. before a timeout, and is illustrated in FIG. 5*c*. These scenarios may relate to action 307 described above.

The second network node 132 may send 521 a terminate signal to the function 130. E.g. the terminate signal may indicate to the function node 130 to discard the predicted reason for not receiving the call and stop all processing.

When the second UE 122 receives the call, the second UE 122 may send 522 a SIP OK, e.g. a SIP 200 OK message, to the second network node 132 wherein the SIP OK may indicate to the second network node 132 that the call has been received. The second network node 132 may send 523 a SIP OK, e.g. a SIP 200 OK message, to the first network node 131 wherein the SIP OK may indicate to the first network node 131 that the call has been received. The first network node 131 may send 524 a SIP OK, e.g. a SIP 200 OK message, to the first UE 131, wherein the SIP OK may indicate to the first UE 131 that the call has been received.

Prediction Algorithm

The following prediction algorithm may relate to e.g. Action 304 and Action 305 above.

| Prediction algorithm |
|---|
| input:<br>Current set of Tracking areas of second UE in last n minutes TR_B,<br>Home zone of second UE HZ_B,<br>Current zone of second UE where it is present at the time incoming call CZ_B,<br>Timestamp when call starts ringing at called second UE T_B. |

-continued

| Prediction algorithm |
| --- |

```
output:
   array to store multiple probable reasons for call no answer RA B
   summary string containing probably why B party is not able to respond to the call S.
For each cell id c in TR_B do
   process c to GPS coordinate g
   store all the GPS coordinates g in Location array L
process array L to return MOVING or STATIC
If second UE MOVING, then
   store MOVING to RA_B
Array of Events EventArray = process L
For each Event E in EventArray
   If E equals "High" then store event title to RA_B
If HomeZone_B is not equal to CurrentZone then store "roaming" to RA_B
Timeslots when call is usually attended setA, Timeslots call is usually declined setB
setA, setB = get_Daily_CallRoutine_of_Called_Party( )
If T is contained in setB then TA = get_Next_Possible_Time_for_call_attending(setA, T)
   store message "Called Party is probably busy and get attend to call, call after <TA>
time" to Call no response reason code array RA_B
return S = process RA_B
return S
```

The function node 130 may execute all or one or more parts of the operations of the above Prediction algorithm when predicting the reason for the second UE 122 not receiving the call from the first UE 121 and will be explained in more detail below.

Prediction Algorithm Input

The above prediction algorithm may take the following inputs:

- Current tracking areas of the second UE 122, e.g. during the last configurable number of minutes,
- a home zone of the second UE 122,
- a current zone of the second UE 122, and
- a timestamp of when the call starts ringing at the second UE 122.

Prediction Algorithm Output

The above prediction algorithm may output to the function node 130 to further handle in embodiments herein. An array of at least one probable reason for not receiving the call, and a summary string comprising the predicted reason why the second UE 122 is not able to receive the call. Hence, in some embodiments, e.g. sending the notification in action 306, the notification may comprise, or be based on the array and the summary string of the output of the prediction algorithm above.

Determining Mobility

The function node 130 may obtain GPS coordinates based on the cell IDs of the current tracking areas of the second UE 122.

When the one or more GPS coordinates for the current tracking areas of the second UE 122 have similar values, e.g. the one or more GPS coordinates have low variance, or the difference of each of the respective current tracking areas of the second UE 122 are smaller than a predetermined threshold, the function node 130 may determine that the second UE 122 is stationary.

When the one or more GPS coordinates for each of the current tracking areas of the second UE 122, e.g. comprises GPS coordinates with differences larger than a threshold, the function node 130 may determine that the UE 122 is travelling or moving.

Further, any statistical analysis of the one or more GPS coordinates may be performed, e.g. by the function node 130, to determine whether the second UE 122 is mobile or stationary.

Determining Events

The function node 130 may obtain events related to the one or more GPS coordinates of the current tracking areas of the second UE 122. This may e.g. relate to action 303 above. The events may be retrieved from e.g. an external news Application Programming Interface (API). The events may be categorized depending on the type of event or impact of the event. For example, the events may be categorized as high impact when they relate to e.g. catastrophes such as floods, explosions, fire hazard, act of terror, earthquake, cyclone, heavy rain with thunderstorms, volcanic eruptions, etc. The events may further also be categorized as low impact when they relate to e.g. minor demonstrations, parades, religious events, bank holidays, etc.

Performing Predictions

In some embodiments, an event may be obtained and may be categorized as a high impact event by the function node 130. The event may then be stored in the array of at least one probable reason for not receiving the call, e.g. by storing the title of the event, where the title of the event may be a descriptive summary of the event.

In some scenarios, the home zone of second UE 122 is different from the current zone of the second UE 122. In these scenarios, the function node 130 may then determine that the second UE 122 is roaming, and a roaming status indicating that the second UE 122 is in roaming mode may be stored in the array of at least one probable reason for not receiving the call.

In some embodiments the function node 130 may further determine the daily routines of the second UE 122. This may be performed by first obtaining out of a set of previous calls, when calls are often received by the second UE 122, e.g. answered by the second UE 122, and when calls are often not received by the second UE 122, e.g. declined, ignored, or missed by the second UE 122. In some embodiments, a time e.g. hour of the day, date, and/or day of the week, may be determined to be the time when the second UE 122 is often receiving calls, based on how many incoming calls is received during that time. In some embodiments, the time may be determined to be the time when the second UE 122 is often receiving calls based on receiving a predetermined ratio of calls out of all of the incoming calls during the time.

In some embodiments the function node 130 may be able to predict, e.g. based on the daily routines of the second UE 122, when the second UE 122 may be able to receive the call. The function node 130 may then store a message in the summary string indicating that the second UE 122 is busy and indicating when the second UE 122 is predicted to be able to receive the call. Thus, the first UE 121 may be able to call back at this time. This may relate to e.g. action 305 above.

In some embodiments, to be able to summarize why the second UE 122 may not be able to receive the call, the function node 130 processes the array of at least one probable reason for not receiving the call. The function node 130 may then further adapt the summary string or generate a new summary, based on the array of at least one probable reason for not receiving the call. In some embodiments, the summary string and/or the array of at least one probable reason for not receiving the call may be sent to the first UE 121, e.g. via the first network node 131.

To perform the method actions above, the function node 130 is configured to handle a voice call from the first UE 121 to be received by a second UE 122 in a communications network 100. The function node 130 is arranged to be associated with the second UE 122. The function node 130 may comprise an arrangement depicted in FIGS. 6*a* and 6*b*.

The function node 130 may comprise an input and output interface 600 configured to communicate with network nodes, servers, and UEs such as e.g. the first UE 121, the second UE 122, the second network node 132, the home server 142, and the third-party server 150. The input and output interface 600 may comprise a wireless receiver (not shown) and a wireless transmitter (not shown).

The function node 130 may further be configured to, e.g. by means of a receiving unit 610 in the function node 130, receive an invite message from the second network node 132 associated with the second UE 122. The invite message relates to an initiation of the voice call from the first UE 121 to the second UE 122. The invite message is adapted to comprise one or more parameters associated with the second UE 122 and a time stamp of the initiating of the voice call.

The one or more parameters associated with the second UE 122 may be adapted to comprise any one or more out of:

a call history of the second UE 122, movement data associated with the second UE 122, a set of one or more trusted callers, and a privacy indication adapted to indicate which information is authorized or unauthorized to send to the first UE 121.

The function node 130 may further be configured to, e.g. by means of a retrieving unit 620 in the function node 130, retrieve location data from a home server 142 associated with the second UE 122, based on the one or more parameters and the time stamp, which location data is adapted to indicate a geographical location of the second UE 122.

In some embodiments the function node 130 may further be configured to, e.g. by means of the retrieving unit 620 in the function node 130, retrieve from a third-party server 150, event data related to an event of the location associated with the location data.

The event data may be adapted to comprise any one or more out of:

an alternative location identifier of the second UE 122, weather conditions associated with the location data, emergency conditions associated with the location data, national holidays associated with the location data, public, cultural, or religious events associated with the location data, and time of day or time zone associated with the location data.

The function node 130 may further be configured to, e.g. by means of a predicting unit 630 in the function node 130, predict a reason why the second UE 122 cannot receive the voice call, based on the location data.

In some embodiments the function node 130 may further be configured to, e.g. by means of the predicting unit 630 in the function node 130, predict a time when the second UE 122 is available to receive the voice call, based on any one or more out of:

location data associated with the second UE 122, the one or more parameters associated with the second UE 122, the predicted reason why the second UE 122 cannot receive the call, and wherein the notification further is adapted to comprise the predicted time when the second UE 122 is available to receive the voice call.

In some embodiments the function node 130 may further be configured to, e.g. by means of the predicting unit 630 in the function node 130, predict the reason why the second UE 122 cannot receive the voice call, further based on the event data.

In some embodiments, the function node 130 may further be configured to, e.g. by means of the predicting unit 630 in the function node 130, predict the time when the second UE 122 is available to receive the voice call further based on the event data.

The function node 130 may further be configured to, e.g. by means of a sending unit 640 in the function node 130, when a time period exceeds without the second UE 122 having received the voice call, send a notification to the first UE 121. The notification may then be adapted to comprise the predicted reason why the second UE 122 cannot receive the voice call.

The function node 130 may further be configured to, e.g. by means of a discarding unit 650 in the function node 130, when the second UE 122 receives the voice call before the time period is exceeded, discard the predicted reason why the second UE 122 cannot receive the voice call.

In some embodiments, the function node 130 is arranged to be comprised in an IMS. The invite message may be adapted to be a SIP message relating to the initiation of the voice call using any of: VoLTE, and VoNR.

Figure 6A:
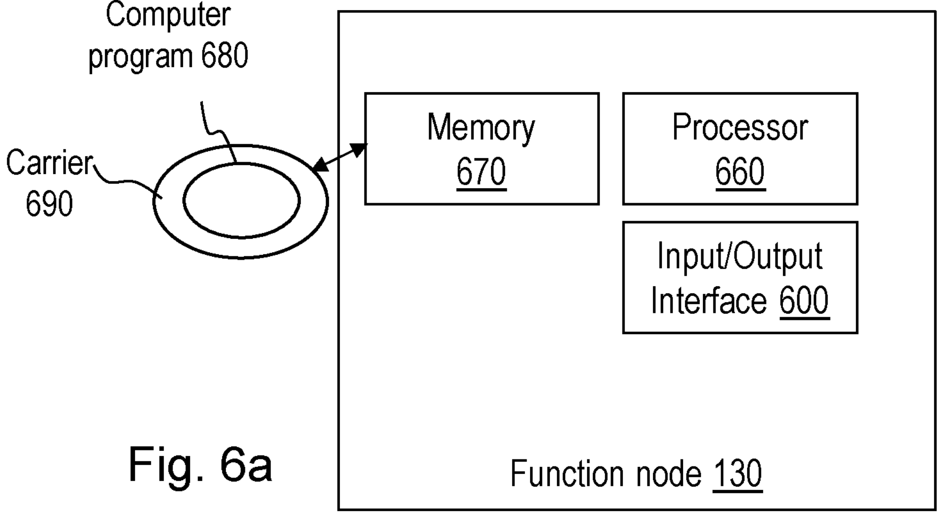
FIG. 6*a-b* are schematic block diagrams illustrating embodiments of a function node.
Figure 6B:
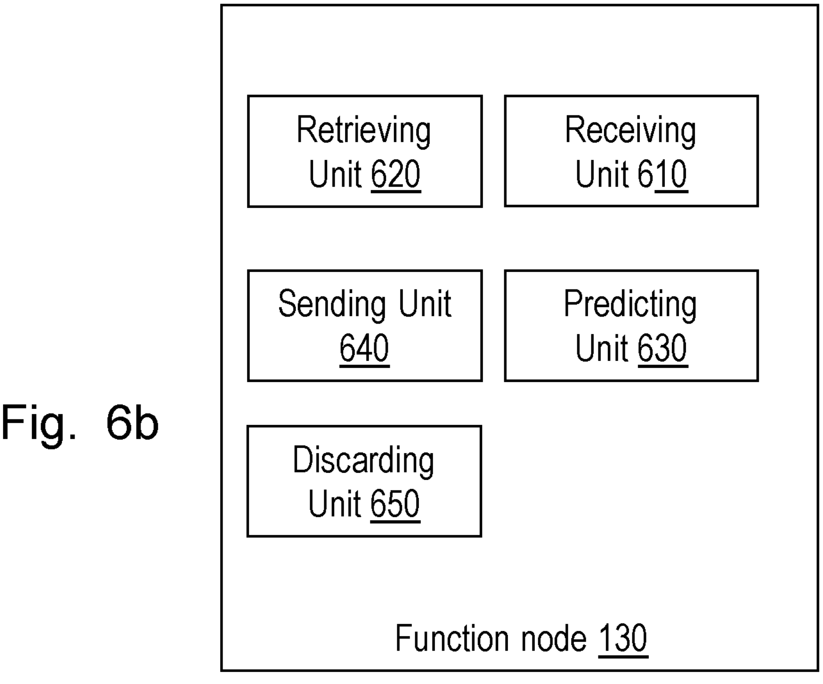

The embodiments herein may be implemented through a respective processor or one or more processors, such as the processor 660 of a processing circuitry in the function node 130 depicted in FIG. 6*a*, together with respective computer program code for performing the functions and actions of the embodiments herein. The program code mentioned above may also be provided as a computer program product, for instance in the form of a data carrier carrying computer program code for performing the embodiments herein when being loaded into the function node 130. One such carrier may be in the form of a CD ROM disc. It is however feasible with other data carriers such as a memory stick. The computer program code may furthermore be provided as pure program code on a server and downloaded to the function node 130.

The function node 130 may further comprise a memory 670 comprising one or more memory units. The memory 670 comprises instructions executable by the processor in function node 130. The memory 670 is arranged to be used to store e.g. information, indications, data, configurations, and applications to perform the methods herein when being executed in the function node 130.

In some embodiments, a computer program 680 comprises instructions, which when executed by the respective at least one processor 660, cause the at least one processor of the function node 130 to perform the actions above.

In some embodiments, a respective carrier 690 comprises the respective computer program 680, wherein the carrier 690 is one of an electronic signal, an optical signal, an electromagnetic signal, a magnetic signal, an electric signal, a radio signal, a microwave signal, or a computer-readable storage medium.

Those skilled in the art will appreciate that the units in the function node 130 described above may refer to a combination of analog and digital circuits, and/or one or more processors configured with software and/or firmware, e.g. stored in the function node 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
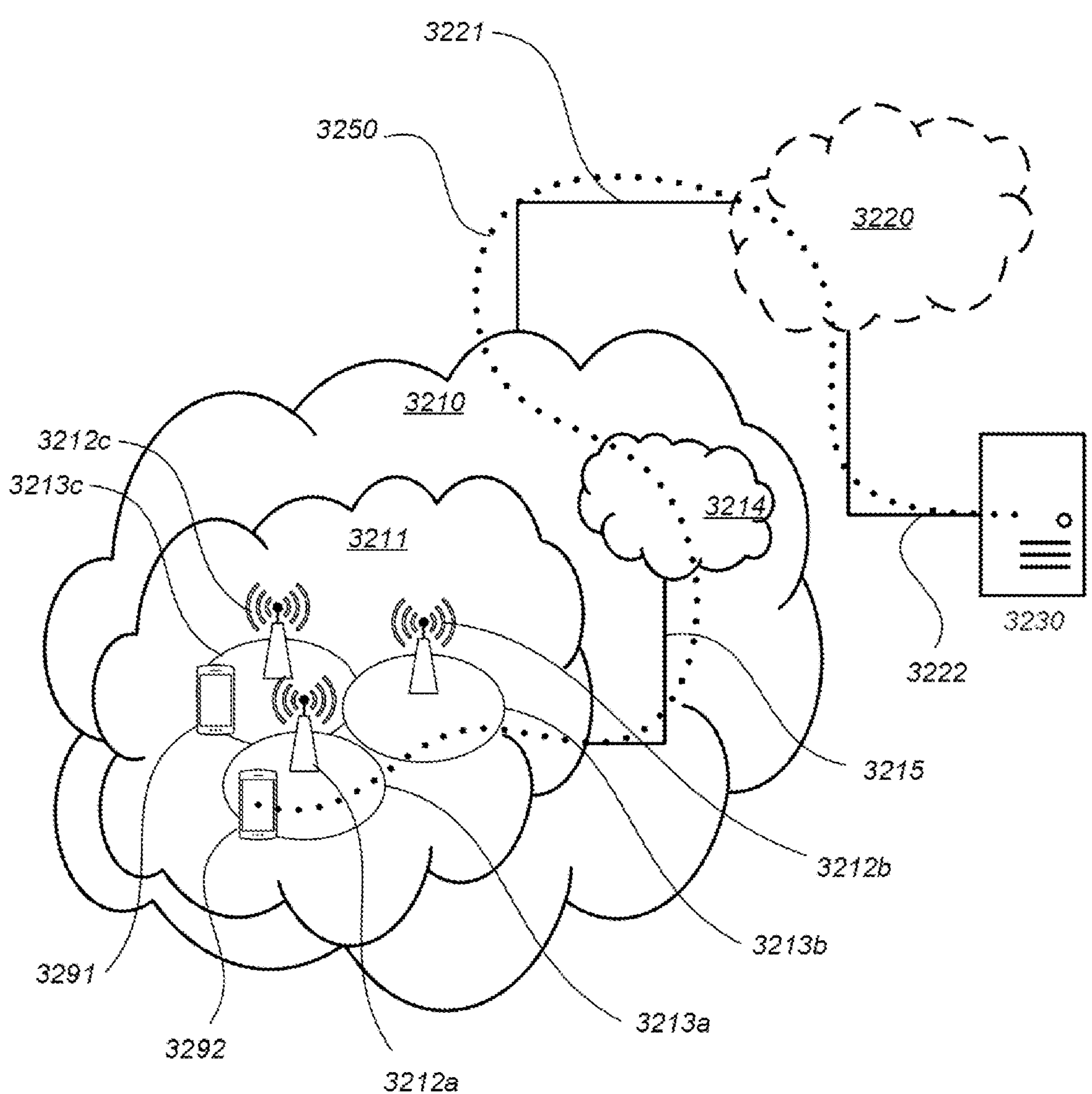
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, e.g. the communications network 100, which comprises an access network 3211, such as a radio access network, and a core network 3214. The access network 3211 comprises a plurality of base stations 3212*a*, 3212*b*, 3212*c*, such as AP STAs NBs, eNBs, gNBs or other types of wireless access points, e.g. the first and second network nodes 131, 132, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) such as a Non-AP STA 3291 or, e.g. the first UE 121, located in coverage area 3213*c* is configured to wirelessly connect to, or be paged by, the corresponding base station 3212*c*. A second UE 3292, 122 such as a Non-AP STA in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm such as .e.g. the cloud 140, the home server 142 or the third-party server 150. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
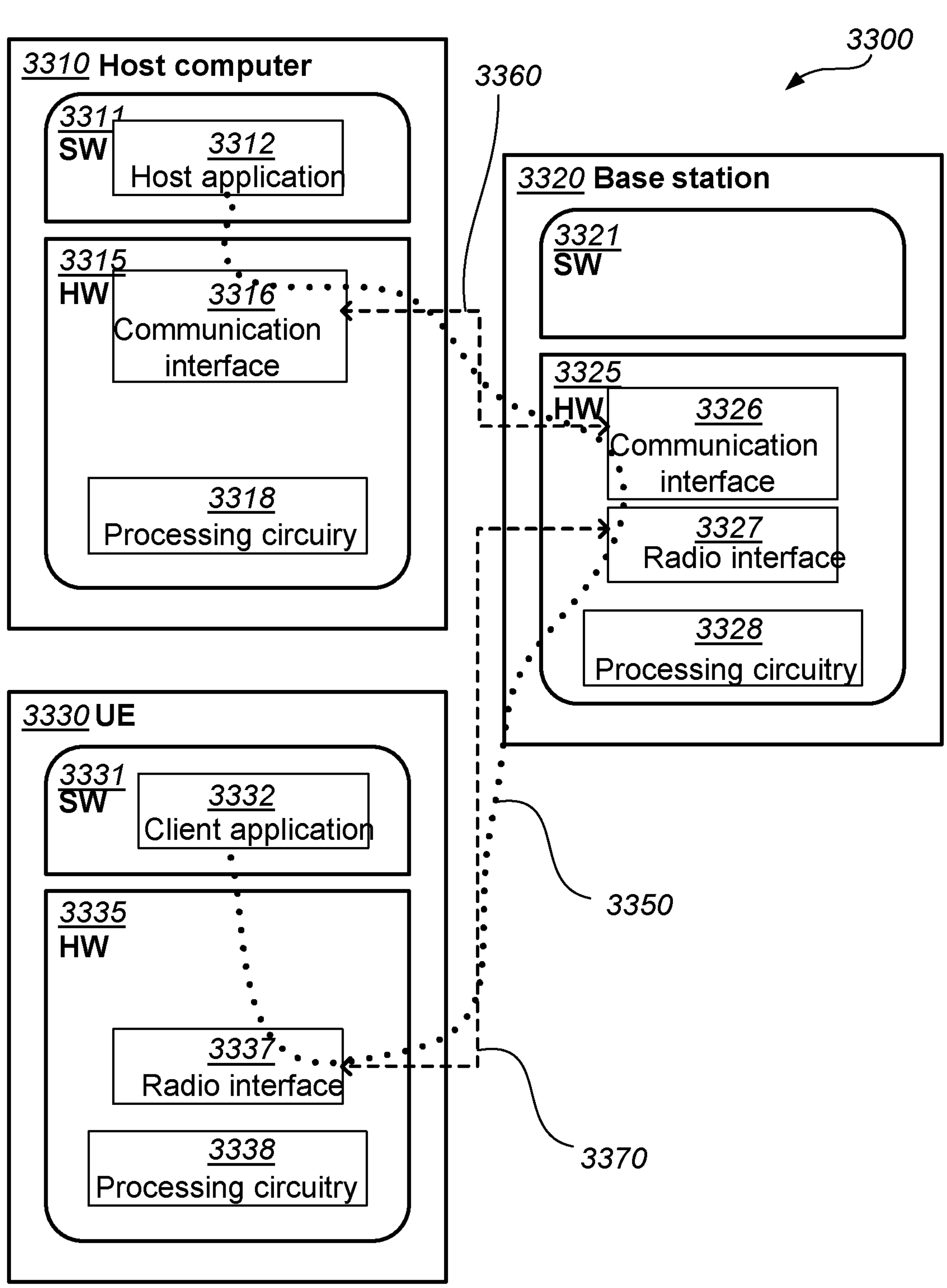
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212*a*, 3212*b*, 3212*c* and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the RAN effect: data rate, latency, power consumption and thereby provide benefits such as reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
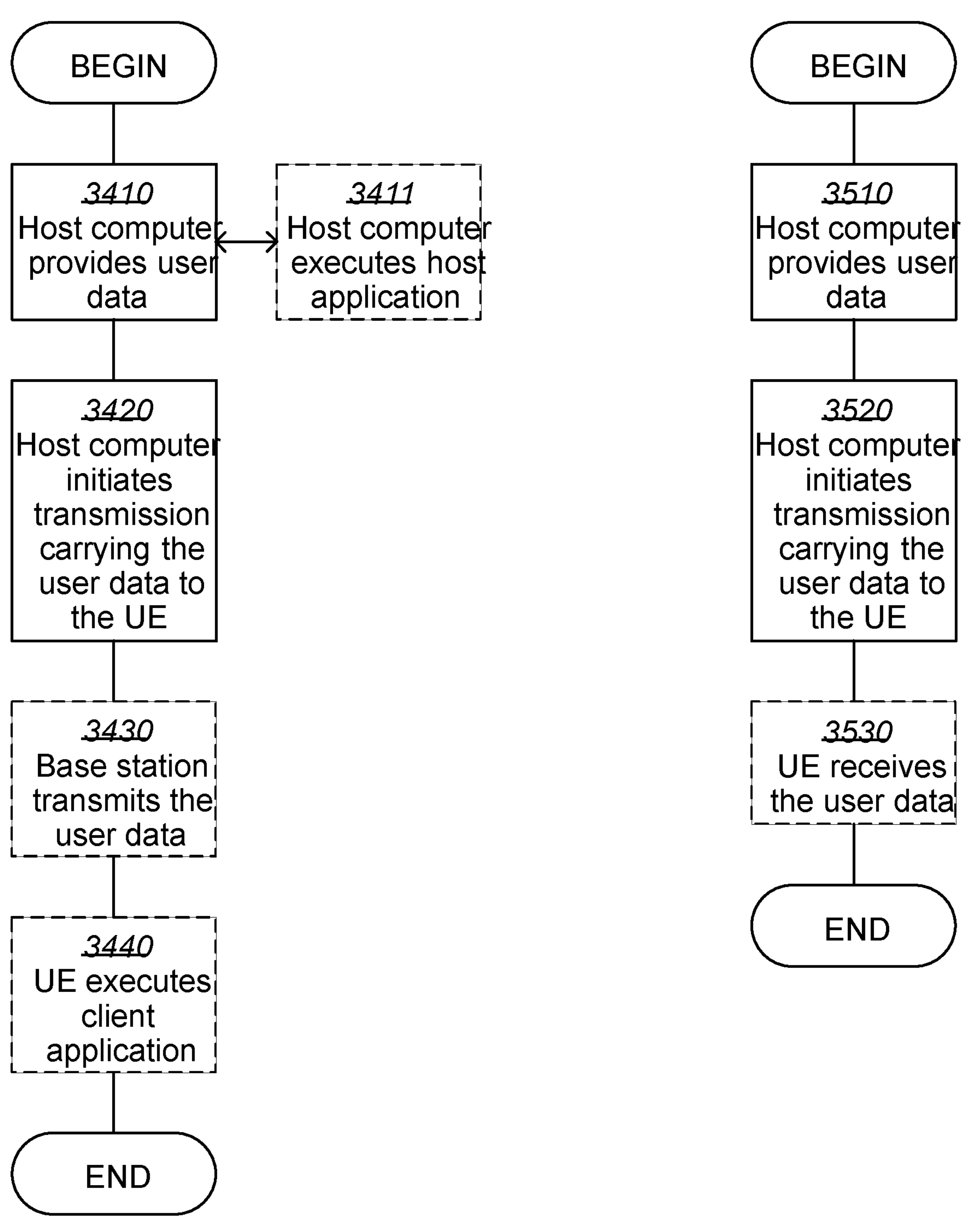
FIGS. 9-12 are flowcharts illustrating methods implemented in a communication system including a host computer, a base station and a user equipment.

FIG. 9 is a flowchart illustrating a method implemented in a communication system, in accordance with one embodiment. The communication system includes a host computer, a base station such as an AP STA, and a UE such as a Non-AP STA which may be those described with reference to FIG. 7 and FIG. 8. For simplicity of the present disclosure, only drawing references to FIG. 9 will be included in this section. In a first step 3410 of the method, the host computer provides user data. In an optional sub step 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station such as an AP STA, and a UE such as a Non-AP STA which may be those described with reference to FIG. 7 and FIG. 8. For simplicity of the present disclosure, only drawing references to FIG. 10 will be included in this section. In a first step 3510 of the method, the host computer provides user data. In an optional sub step (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figures 11, 12:
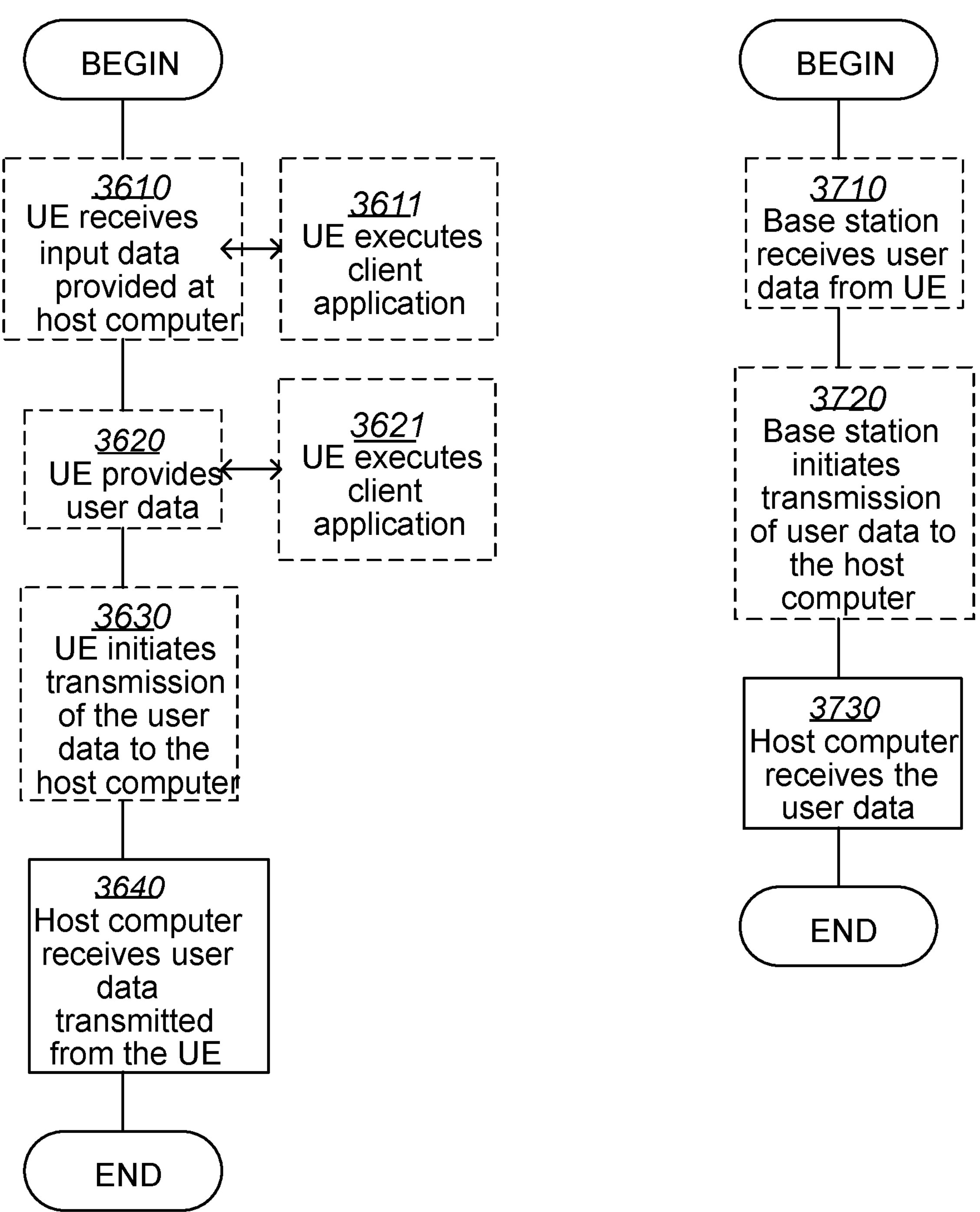

FIG. 11 is a flowchart illustrating a method implemented in a communication system, in accordance with one embodiment. The communication system includes a host computer, a base station such as an AP STA, and a UE such as a Non-AP STA which may be those described with reference to FIG. 7 and FIG. 8. For simplicity of the present disclosure, only drawing references to FIG. 11 will be included in this section. In an optional first step 3610 of the method, the UE receives input data provided by the host computer. Additionally, or alternatively, in an optional second step 3620, the UE provides user data. In an optional sub step 3621 of the second step 3620, the UE provides the user data by executing a client application. In a further optional sub step 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third sub step 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as an AP STA, and a UE such as a Non-AP STA which may be those described with reference to FIG. 7 and FIG. 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

| Abbreviation | Explanation |
|---|---|
| CNREF | Call No Response Enrichment Function |
| 3GPP | Third-Generation Partnership Project |
| 5GC | 5G Core |
| AF | Application Function |
| API | Application Programming Interface |
| CN | Core Network |
| CP | Control Plane |
| CSP | Communication Service Provider |
| NF | Network Function |
| TA | Tracking Area |
| QoE | Quality of Experience |

The invention claimed is:

1. A method performed by a function node for handling a voice call from a first User Equipment, UE, to be received by a second UE in a communications network, wherein the function node is associated with the second UE, the method comprising:

receiving from a second network node associated with the second UE, an invite message relating to an initiation of the voice call from the first UE to the second UE, which invite message comprises one or more parameters associated with the second UE and a time stamp of the initiating of the voice call, retrieving location data from a home server associated with the second UE, based on the one or more parameters and the time stamp, which location data indicates a geographical location of the second UE, predicting a reason why the second UE cannot receive the voice call, based on the location data, and when a time period exceeds without the second UE having received the voice call, sending a notification to the first UE, which notification comprises the predicted reason why the second UE cannot receive the voice call, when the second UE receives the voice call before the time period is exceeded, discarding the predicted reason why the second UE cannot receive the voice call.

2. The method according to claim 1, further comprising:

predicting a time when the second UE is available to receive the voice call, based on any one or more out of:

location data associated with the second UE, the one or more parameters associated with the second UE, the predicted reason why the second UE cannot receive the call, and wherein the notification further comprises the predicted time when the second UE is available to receive the voice call.

3. The method according to claim 1, further comprising:

retrieving from a third-party server, event data related to an event of the location associated with the location data, and wherein any one or more out of: predicting the reason why the second UE cannot receive the voice call, and predicting the time when the second UE is available to receive the voice call, are further based on the event data.

4. The method according to claim 3, wherein the event data comprises any one or more out of:

an alternative location identifier of the second UE, weather conditions associated with the location data, emergency conditions associated with the location data, national holidays associated with the location data, public, cultural, or religious events associated with the location data, and time of day or time zone associated with the location data.

5. The method according to claim 1, wherein the one or more parameters associated with the second UE comprises any one or more out of:

a call history of the second UE, movement data associated with the second UE, a set of one or more trusted callers, and a privacy indication indicating which information is authorized or unauthorized to send to the first UE.

6. The method according to claim 1, wherein the function node is comprised in an Internet Protocol Media Subsystem, IMS, and wherein the invite message is a Session Initiation Protocol, SIP, message relating to the initiation of the voice call using any of: Voice over Long Term Evolution, VoLTE, and Voice over New Radio, VoNR.

7. A function node configured to handle a voice call from a first User Equipment, UE, to be received by a second UE in a communications network, wherein the function node is arranged to be associated with the second UE, and wherein the function node further is configured to:

receive from a second network node associated with the second UE, an invite message relating to an initiation of the voice call from the first UE to the second UE, which invite message is adapted to comprise one or more parameters associated with the second UE and a time stamp of the initiating of the voice call, retrieve location data from a home server associated with the second UE, based on the one or more parameters and the time stamp, which location data is adapted to indicate a geographical location of the second UE, predict a reason why the second UE cannot receive the voice call, based on the location data, and when a time period exceeds without the second UE having received the voice call, send a notification to the first UE, which notification is adapted to comprise the predicted reason why the second UE cannot receive the voice call, when the second UE receives the voice call before the time period is exceeded, discard the predicted reason why the second UE cannot receive the voice call.

8. The function node according to claim 7, further being configured to:

predict a time when the second UE is available to receive the voice call, based on any one or more out of:

location data associated with the second UE, the one or more parameters associated with the second UE, the predicted reason why the second UE cannot receive the call, and wherein the notification further is adapted to comprise the predicted time when the second UE is available to receive the voice call.

9. The function node according to claim 7, further being configured to:

retrieve from a third-party server, event data related to an event of the location associated with the location data, and any one or more out of:

predict the reason why the second UE cannot receive the voice call, further based on the event data and predict the time when the second UE is available to receive the voice call further based on the event data.

10. The function node according to claim 9, wherein the event data is adapted to comprise any one or more out of:

an alternative location identifier of the second UE, weather conditions associated with the location data, emergency conditions associated with the location data, national holidays associated with the location data, public, cultural, or religious events associated with the location data, and time of day or time zone associated with the location data.

11. The function node according to claim 7, wherein the one or more parameters associated with the second UE are adapted to comprise any one or more out of:

a call history of the second UE, movement data associated with the second UE, a set of one or more trusted callers, and a privacy indication adapted to indicate which information is authorized or unauthorized to send to the first UE.

12. The function node according to claim 7 wherein the function node is arranged to be comprised in an Internet Protocol Media Subsystem, IMS, and wherein the invite message is adapted to be a Session Initiation Protocol, SIP, message relating to the initiation of the voice call using any of: Voice over Long Term Evolution, VoLTE, and Voice over New Radio, VoNR.

13. A non-transitory computer readable medium storing instructions executable by processing circuitry of a function node configured to handle a voice call from a first User Equipment (UE) to be received by a second UE in a communications network, wherein the function node is arranged to be associated with the second UE, and wherein, by execution of the instructions by the processing circuitry, the function node is configured to:

receive from a second network node associated with the second UE, an invite message relating to an initiation of the voice call from the first UE to the second UE, which invite message is adapted to comprise one or more parameters associated with the second UE and a time stamp of the initiating of the voice call, retrieve location data from a home server associated with the second UE, based on the one or more parameters and the time stamp, which location data is adapted to indicate a geographical location of the second UE, predict a reason why the second UE cannot receive the voice call, based on the location data, and when a time period exceeds without the second UE having received the voice call, send a notification to the first UE, which notification is adapted to comprise the predicted reason why the second UE cannot receive the voice call, when the second UE receives the voice call before the time period is exceeded, discard the predicted reason why the second UE cannot receive the voice call.

* * * * *